United States Patent

Martin, Jr. et al.

[15] 3,688,924
[45] Sept. 5, 1972

[54] SELF PROPELLED SEWAGE SLUDGE EXCAVATOR

[72] Inventors: Paul B. Martin, Jr., Walkertown; Gilbert W. Spencer, Winston-Salem, both of N.C.

[73] Assignee: R. J. Reynolds Tobacco Company, Forsyth, N.C.

[22] Filed: June 24, 1971

[21] Appl. No.: 156,358

[52] U.S. Cl. ............214/17 DB, 37/192 R, 198/77, 198/110, 198/148, 198/152, 210/271, 210/527
[51] Int. Cl. .......................................B65g 65/38
[58] Field of Search.....214/17 DB; 37/191 R, 192 R; 210/271, 527; 15/146.5; 198/77, 110, 148, 152

[56] References Cited

UNITED STATES PATENTS

| | | | |
|---|---|---|---|
| 2,801,014 | 7/1957 | Colson | 214/17 DB |
| 3,473,185 | 10/1969 | Bahr | 214/17 DB |

*Primary Examiner*—Robert G. Sheridan

[57] ABSTRACT

Apparatus for removing dried sludge from the upper surface of a drying bed in a sewage treatment plant including an excavator which has a plurality of double tined conveyor scoops which travel in an endless path to remove caked sludge from the drying bed and deposit it onto a conveyor. The excavator is positioned for reciprocation above the bed in parallel rows with the double tined scoops enabling excavation in both directions of movement of the excavator along the parallel rows. The trailing edge of the scoops is prevented from cutting into the sand as the scoops commence their upward movement after being charged with the sludge.

10 Claims, 7 Drawing Figures

Patented Sept. 5, 1972

INVENTORS
PAUL B. MARTIN, JR.
GILBERT W. SPENCER

INVENTORS
PAUL B. MARTIN, JR.
GILBERT W. SPENCER

Patented Sept. 5, 1972

INVENTORS
PAUL B. MARTIN, JR.
GILBERT W. SPENCER

# SELF PROPELLED SEWAGE SLUDGE EXCAVATOR

BACKGROUND OF THE INVENTION

The present invention relates in general to conveying apparatus and more particularly to apparatus for excavating dried sewage sludge from the top of a sewage drying bed.

It is customary in many sewage plants to remove organic wastes from the liquid under treatment by filtration through a bed containing a sublayer of gravel covered by a layer of sand. The build-up of sludge on the bed reduces the filtration rate. It is common practice to periodically take a given bed off stream, allow the sludge and the bed to dry, and remove the dried sludge.

At present, the dried sludge which dries with mudlike characteristics to form irregular cakes of 1½ to 3 inches in thickness is removed manually from the drying beds by workmen using corn forks to load the sludge onto a belt conveyor which spans the beds and conveys the sludge to a truck. This manual cleaning of the bed is a slow, tedious operation. Due to the physical labor involved and the poor working conditions, it is difficult to obtain and retain personnel to perform this work.

Another disadvantage of the prior art manual cleaning procedure is that the workmen walk upon and disrupt the bed. A typical drying bed when freshly replenished has a 6-inch layer of gravel overlayered with an 8-inch layer of filtering sand. In walking upon the surface of the bed in the course of removing the dried sludge, the workmen's footprints create variations in the thickness of the sand layer which manifests itself in causing the bed to dry out unevenly. Thus, one area of a bed may appear fully drained and cured while another area remains soggy. In accordance with the present invention, a more uniform bed is maintained since the necessity for workmen stepping upon the bed is obviated, and a reduction in bed drying time should be obtained.

SUMMARY OF THE INVENTION

It is a primary object of the present invention to provide a fully mechanized approach for removing the sludge from sewage drying beds.

Another major object of the present invention is to effect sludge removal from a drying bed with minimum disturbance of the sand layer in order to maintain greater bed uniformity and consequently to achieve an overall reduction in the bed drying time.

The above and other objects, features, and advantages of the invention will become more apparent as this description proceeds.

A presently preferred embodiment of the invention comprises an excavator which is constituted by a plurality of limited tilting double tined scoops connected to an endless chain drive. The scoops pick up the sludge cake from the bed leaving the sand layer relatively undisturbed and transport the sludge upwardly to be discharged onto a conveyor for eventual removal from the bed area. The scoops are double tined to enable the chain conveyor to be driven in both directions so that there is no lost time when the excavator traverses the drying bed in two directions along parallel rows by means of a reciprocating carriage mechanism. The carriage mechanism at the end of each row is advanced the width of the excavator in a direction perpendicular to the row direction to ready the excavator for its next movement across the bed.

Adjustment means are provided for providing the leading edges of the scoops with a slight downward tilt regardless of which direction the scoops are moving in order to avoid the trailing edge of the scoop "heeling" or cutting through the sand as the scoop passes through the sludge pickup zone and is cocked to travel upwardly to the zone of discharge onto the conveyor.

Additional adjustment means are provided to elevate the scoop assembly to clear the drying bed walls and to compensate for varying sand depths from bed to bed so that the apparatus may be utilized to clean beds of different dimensions.

DETAILED DESCRIPTION OF THE INVENTION

Figure 1:
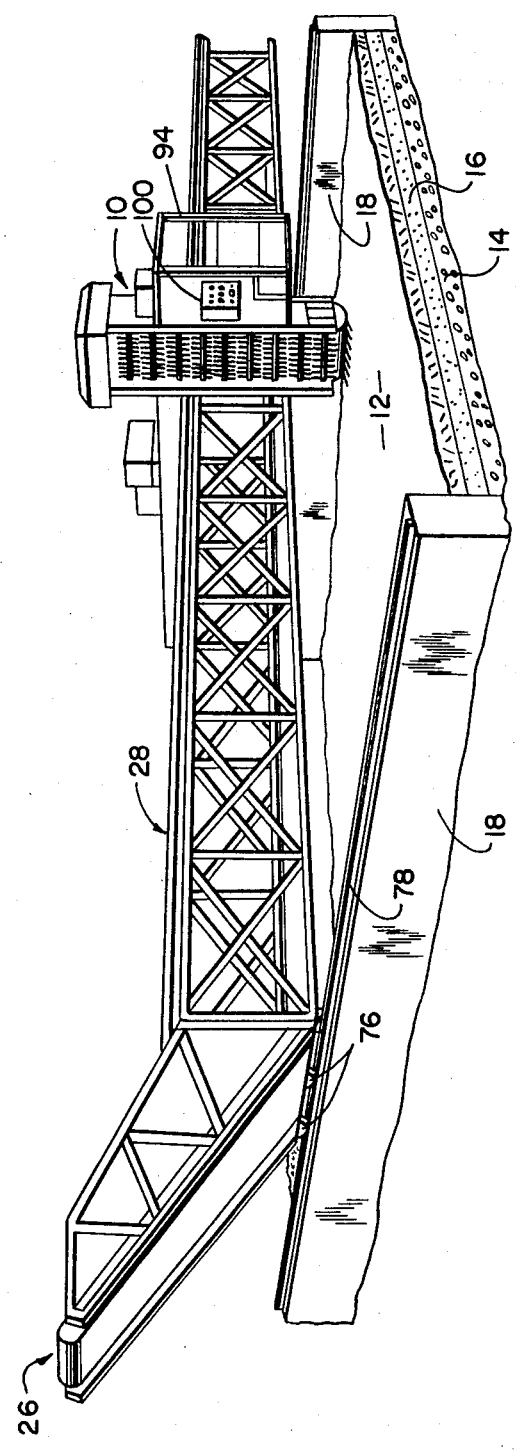
FIG. 1 is a perspective view of a presently preferred embodiment of the invention installed in a sewage treatment plant.
Figure 2:
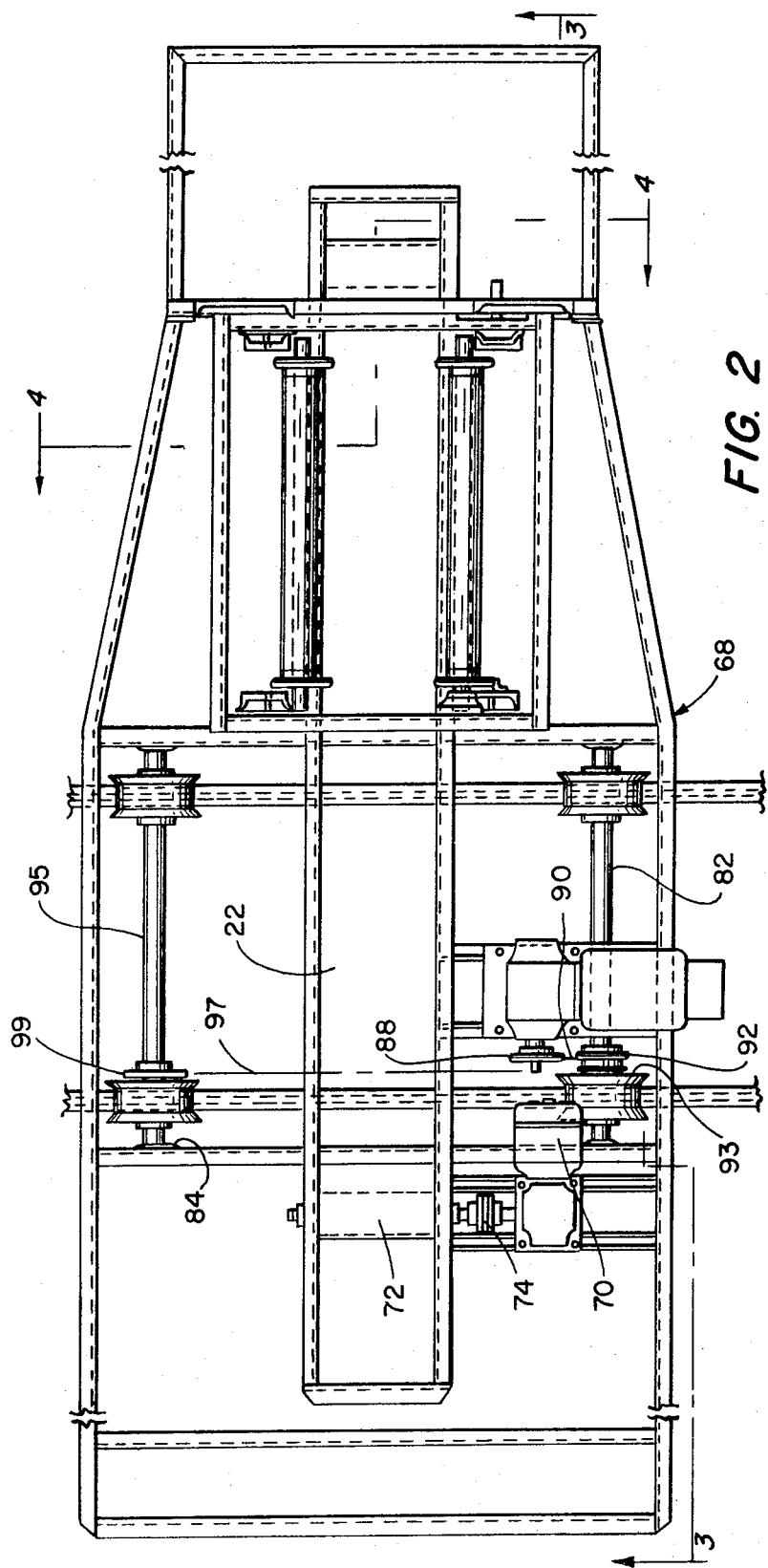
FIG. 2 is a plan view of a portion of the apparatus showing FIG. 1.

Referring now to the drawings and more particularly to FIG. 1, reference numeral 10 generally designates an excavator in accordance with a presently preferred embodiment of the invention. The excavator is utilized to remove a dried sludge layer 12 from the top of a sewage drying bed comprising a gravel underlayer 14 and a sand top layer 16. Low concrete walls 18 extend around the perimeter of each bed and, as is customary, a number of drying beds may be arranged in rows separated from each other by one of the walls 18.

As will be explained more fully hereinafter, the excavator 10 removes the sludge and transports it upwardly for discharge onto a cross conveyor 22 from which the sludge passes through chute 24 onto a conveyor 26 which is connected to a framework 28 spanning the bed. The discharge end of conveyor 26 which is inclined upwardly as seen in FIG. 1 is intended to discharge the sludge into a truck or similar vehicle for disposal.

The excavator 10 contains a vertically disposed endless conveyor mechanism comprising a plurality of double tined scoops generally designated by reference numeral 30 which are connected to a pair of endless chains 32. The chains are driven by a motor 34, a drive chain 36 trained around suitable sprockets 38 and 40. The sprockets 40 rotate a shaft 42 causing rotation of conveyor drive sprockets 44 which are in toothed engagement with the chains 32 at the bottom of their path of movement. At the top of their path of movement the chains 32 are trained over two spaced pairs of sprockets 46 with the sprockets of each pair being disposed at opposite ends of a shaft disposed within tubing 48.

Figure 5:
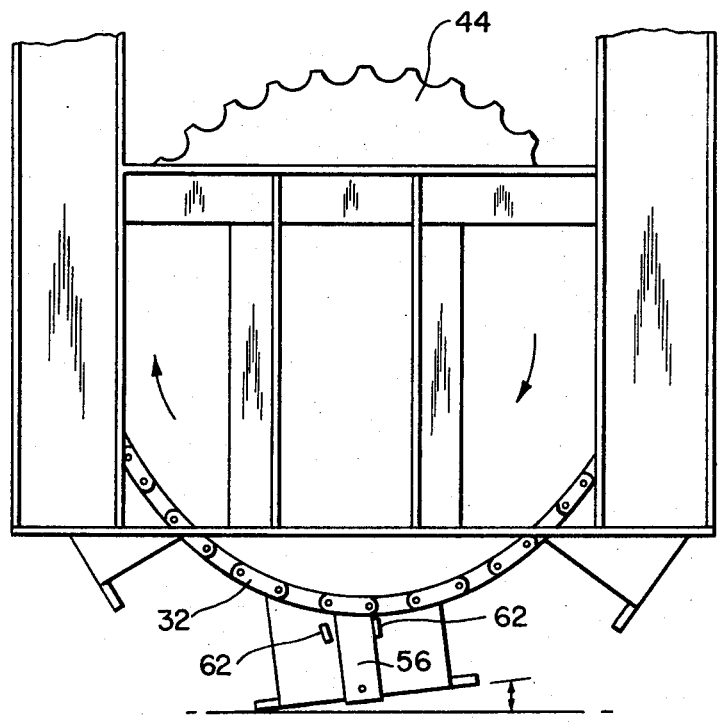
FIG. 5 is a detail view on an enlarged scale showing the position of one of the scoops at the time of removing sludge from a drying bed.
Figure 6:
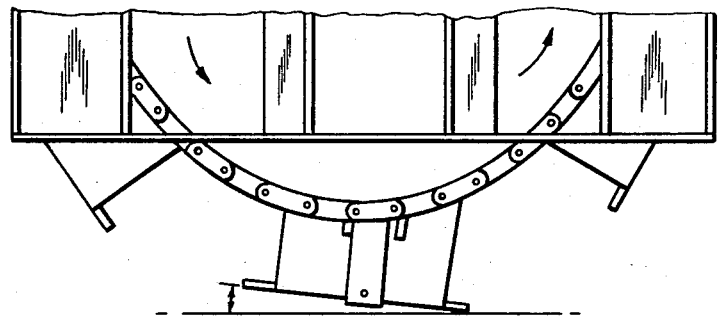
FIG. 6 is a view similar to FIG. 5 but showing the excavator moving in the opposite direction.
Figure 7:
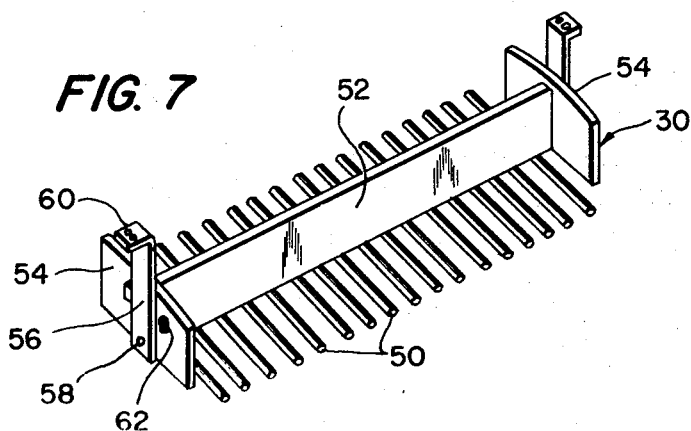
FIG. 7 is a perspective view of a double tined scoop utilized in carrying out the present invention.

Referring to FIGS. 5-7 which best illustrate the details of the scoops 30, it will be seen that each scoop is comprised of a plurality of spaced rods 50 welded to the bottom of a central wall member 52 and a pair of side walls 54. This structure results in a double tined arrangement, i.e., a scoop structure which may be utilized to remove sludge from the drying beds in both directions of movement of the chains 32. The scoops are attached to the conveyor chains by support arms 56 which are pivotally connected to the scoops at their lower ends at pivot points 58 and which have upper flanges 60 secured to the chains 32. In view of the pivot points 58, the scoops may move arcuately about these pivot points but this movement is limited by abutment blocks 62. Two abutment blocks are secured to each side wall 54 on opposite sides of the support arm 56.

FIGS. 5 and 6 illustrate the purpose of the abutments 62 and also illustrate the scoops operating in both directions of rotation of the chains 32. In FIG. 5, the conveyor chains 32 are rotating clockwise as shown by the arrows. Each scoop 30 approaches the sludge pickup zone at the bottom of the conveyor chain path with the lower end of the scoop tilted downwardly or counterclockwise with regard to the support arm 56 due to gravity. The extent of tilting is limited by the support arm 56 abutting against the right-hand abutment 62. Thus, when the scoop approaches the bottom of its path of travel and initially contacts the sludge, the rods 50 are tilted downwardly at a slight angle to the horizontal as shown in FIG. 5. The rods 50 which constitute the tines break into and pick up the sludge which normally is in the form of irregular cakes of 1½ to 3 inches thickness with minimal disturbance of the sand layer. The downward tilting of the leading edges of the scoop which may be in the order of 5° or so prevents the trailing or right-hand ends of the rods 50 "heeling" or cutting into and disrupting the sand layer as the scoop passes through the pickup zone and commences upward vertical movement along the endless conveyor path. It will be appreciated that with the conveyor chains moving clockwise sludge is picked up only by the rods at the left-hand side of the scoops as seen in FIG. 5, and that when the loaded scoops move upwardly to their discharge zone, the sludge will be to a large part supported against the surface of the central wall 52.

When the conveyor chains 32 are rotating in the opposite direction, i.e., counterclockwise as shown in FIG. 6, the principle of operation is the same but in this case the right-hand end of each scoop is tilted downwardly around pivot point 58 with the extent of this movement being limited by the support arm 56 contacting the left-hand abutment 62. In this case it is the right-hand half of the scoops which is utilized in picking up the sludge rather than the left-hand half as was the case with the conveyor chains rotating clockwise as illustrated in FIG. 5.

Figure 3:
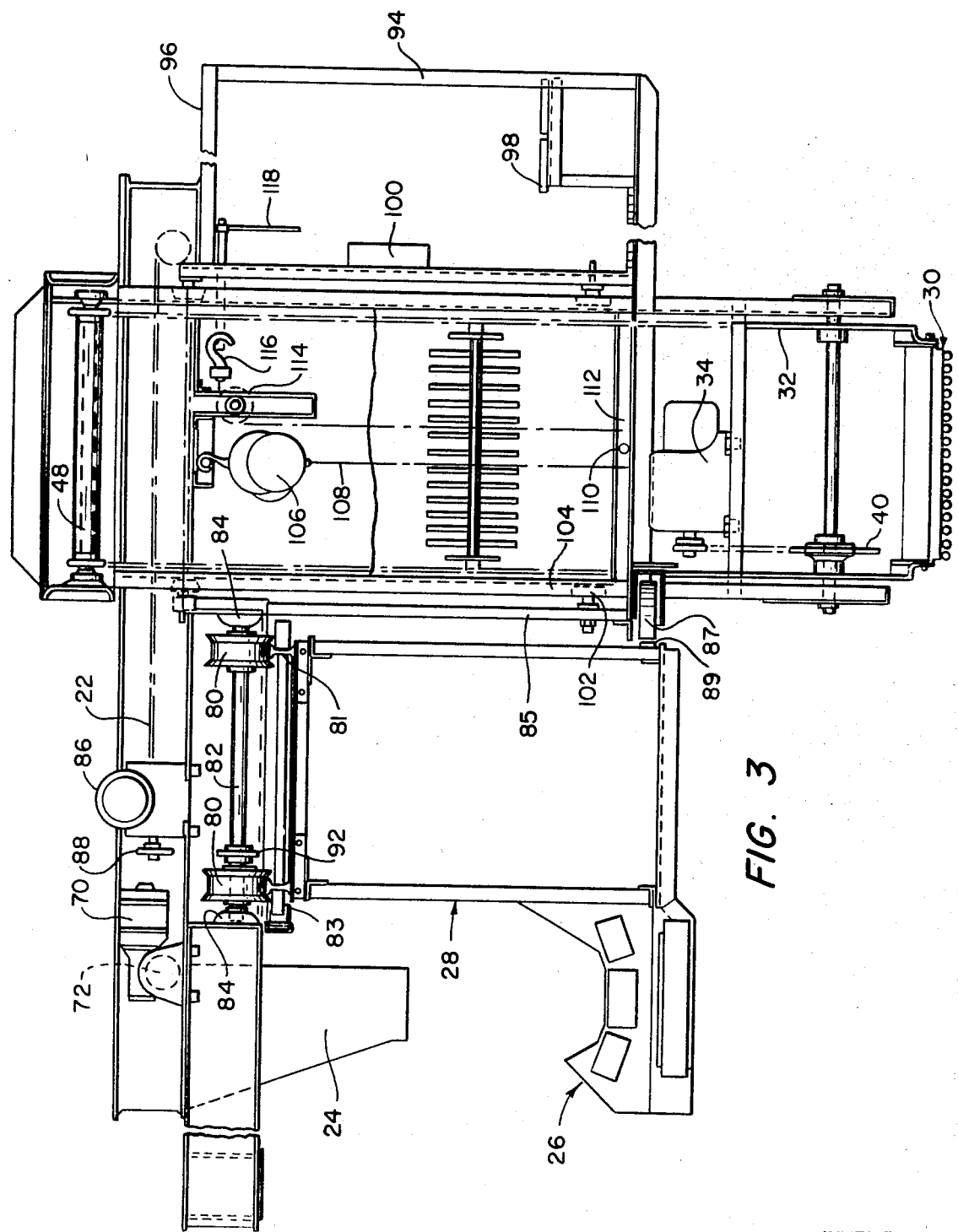
FIG. 3 is a vertical cross-sectional view taken generally on the line 3—3 of FIG. 2.
Figure 4:
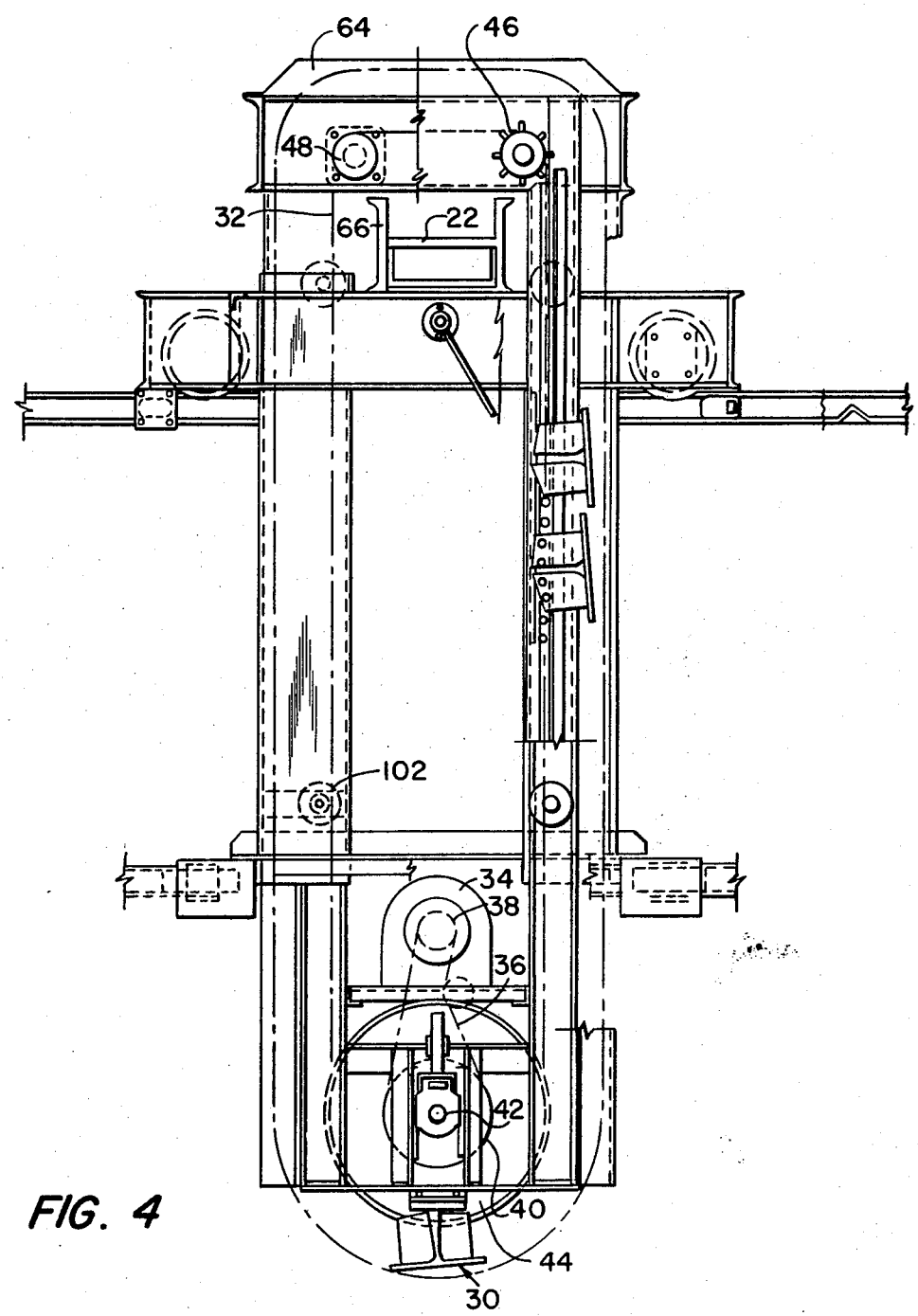
FIG. 4 is a vertical cross-sectional view taken on the line 4—4 of FIG. 2.

The scoops when loaded with sludge move vertically upwardly and then pass over sprockets 46 beneath a cover 64 as seen in FIGS. 3 and 4. During the horizontal path of movement of the chains between the pairs of sprockets 46 at which point the scoops are above the chains, the sludge falls off the scoops 30 onto the cross conveyor 22. In the illustrated embodiment conveyor 22 is an endless belt which extends between a pair of fixed side walls 66 formed by channel irons supported upon cross members of an upper excavator horizontal frame generally designated by reference numeral 68. The belt conveyor is driven by a right angle gear motor 70 which is connected to the shaft of a conveyor drive roller 72 via a coupling 74.

As mentioned previously, the conveyor 22 discharges the sludge through a chute 24 onto a conveyor 26 attached to a framework 28, both of which span the drying bed. The details of conveyor 26 and framework 28 are not a material part of this invention. In fact, these devices are existing structure in a number of sewage treatment plans and heretofore it has been customary for workmen to manually shovel the sludge from the bed onto the conveyor 26 which in the illustrated embodiment is shown as a belt conveyor. The entire assembly may be moved longitudinally along the drying bed, i.e., from left to right or vice versa as seen in FIG. 1 via wheels 76 on the bottom of framework 28 which run along tracks 78 provided on top of the walls 18.

The excavator is moved transversely of the bed 12, i.e., between the walls 18 illustrated in FIG. 1 by means of a carriage assembly comprising two pairs of double flanged wheels 80 which run on tracks 81 on top of the framework 28. Each pair of wheels 80 is rigidly connected to a shaft 82. The shafts 82 are rotatably connected to the excavator frame 68 by ball bearing units 84 at both ends of the shafts. As seen in FIG. 3, casters 83 which are connected to a support structure 85 for the excavator engage the vertical portions of tracks 81 to preclude unwanted lateral movement. Similarly, a caster 87 which is connected to the vertical framework of the excavator engages a channel member 89 which is secured adjacent the bottom of the framework 28. Movement of the carriage assembly along the tracks 81 is caused by right angle gear motor 86. The motor 86 has a drive sprocket 88 which rotates the front shaft 82 via chain 90 and a sprocket 92 which is rigidly connected to the front shaft 82. In turn, drive sprocket 93 mounted on front shaft 82 rotates rear shaft 95 via chain 97 and sprocket 99 to thereby afford four-wheel drive for the carriage assembly.

The operation of the apparatus is controlled by an operator located in an operator's booth 94 which has a roof 96, a seat 98, and a control panel 100 (FIG. 3).

In order to move the excavator 10 from one bed 12 to another, it is necessary to elevate the lower end of the excavator above the height of the wall 18. This is accomplished by mounting the excavator 10 for vertical reciprocating movement relative to the vertically fixed support structure 85 to which are connected metal rollers 102 located in U-shaped tracks in a vertically adjustable frame 104 of the excavator. The vertical position of the excavator is regulated via an electrically actuated hoist 106 and a chain 108 which is trained about a sprocket 110 which is rotatably connected to a cross member 112 of the excavator frame 104. At its upper end, the chain 108 is trained about a sprocket 114 and terminates in a hook 116 which is connected to a ratchet wrench 118 located in the operator's booth 94.

While it is believed that the operation of the apparatus is apparent from the foregoing description, the main operational steps will be briefly summarized. For purposes of illustration, it will be assumed that the apparatus is in the position shown in FIG. 1 and is ready to start another traverse across the bed 12. With the conveyors 22 and 26 already in operation, the operator actuates motor 34 to drive the chains 32 and scoops 30 clockwise, and then actuates motor 86 to commence movement of the excavator along the tracks 81 on the framework 28. When the excavator reaches the opposite side of the bed 12, movement of the excavator is stopped. An electrical sensing control may be provided to prevent over-travel of the excavator as it approaches the walls 18. The operator now causes the entire illustrated apparatus to move to the right as seen in FIG. 1 a distance equal to the width of scoops 30. This movement is accomplished by a control means and a motor not shown which cause the wheels 76 to move along the tracks 78 on top of the walls 18. Then, after the operator reverses the direction of rotation of the scoops 30 and chains 32, i.e., so that they now rotate counterclockwise, the excavator is caused to again move along the tracks 81 but now from the front wall 18 to the rear wall.

When it is desired to move the excavator 10 from one bed 12 to another, for example, to a bed on the opposite side of the rear wall 18, the excavator is elevated within the support structure 85 by the hoist assembly to a height sufficient to clear the wall 18. Then the excavator may be moved further along the tracks 81 onto the adjacent bed for use in removing sludge from that bed.

While a presently preferred embodiment of the invention has been shown and described with particularity, it will be appreciated that many changes and modifications may readily suggest themselves to those of ordinary skill in the art upon being apprised of the present invention. For example, certain aspects of the invention may have utility outside of the sewage treatment art, and other conveyor drive means equivalent to those described might be utilized. It is intended to encompass these and all other changes and modifications which fall within the scope and spirit of the appended claims.

What is claimed is:

1. In a sewage treatment system having at least one drying bed, walls surrounding said drying bed, a framework extending across said drying bed, and means for moving said framework along the length of said drying bed, the improvement comprising excavator means for removing sludge deposited upon said drying bed, said excavator means including a plurality of interconnected spaced scoops travelling in an endless path, said scoops at the lowermost portion of said endless path being in position to engage the sludge to be removed, drive means to move said scoops interchangeably in both a clockwise direction and in a counterclockwise direction in said endless path, said scoops having a configuration to remove sludge in both directions of movement of said scoops in said endless path, adjustment means to adjust the position of said scoops at the bottom of their path of movement relative to the upper surface of said drying bed, means for reciprocating said excavator along said framework, and conveyor means to receive sludge discharged by said scoops at a discharge zone in their path of travel and to convey said sludge away from said excavator.

2. A system according to claim 1, wherein each scoop comprises a central wall member, a pair of side walls at opposite ends of said central wall member, and a plurality of elongated rod members secured to the bottom of said center wall member generally perpendicular thereto and extending on each side of said central wall member.

3. A system according to claim 1, further comprising a pair of endless chains, support arms pivotally connected at one end to said scoops and at the other end being rigidly connected to said endless chains, and abutment means to limit the relative pivotal movement between each scoop and its respective support arms so that regardless of the direction of rotation of the scoops in said endless path the forward edge of the scoop is inclined downwardly at a small angle to the horizontal at the bottom of said endless path.

4. A system according to claim 1, wherein said means for reciprocating said excavator along said framework comprises a wheeled carriage connected to said excavator, tracks mounted on said framework upon which said wheeled carriage reciprocates, and drive means for said wheeled carriage.

5. A system according to claim 4, wherein said conveyor means includes an endless belt conveyor having a feed end positioned beneath a zone of sludge discharge from said scoops, said endless belt conveyor being connected to said excavator and moved jointly therewith along said framework.

6. A system according to claim 1, wherein said excavator includes a vertically fixed support structure and a frame in sliding engagement with respect to said support structure, and hoist means to elevate said frame with respect to said support structure to enable said excavator to pass along said framework over one of the walls of said drying bed.

7. An excavator comprising a plurality of interconnected spaced scoops travelling in an endless path, drive means including a pair of endless chains to move said scoops interchangeably in both a clockwise direction and in a counterclockwise direction in said endless path, said scoops having openings at two opposite sides to enable material to be conveyed to enter said scoops in both directions of movement of said scoops in said endless path, means to vertically adjust the position of said scoops in a pickup zone relative to the material to be conveyed, each scoop having a pair of support arms pivotally connected thereto, said support arms being rigidly connected at one end to said endless chains, and abutment means to limit the relative pivotal movement between each scoop and its respective support arms so that regardless of the direction of rotation of the scoops in said endless path the forward edge of the scoop is inclined downwardly at a small angle to the horizontal as each scoop enters the pickup zone.

8. Apparatus according to claim 7, wherein each scoop comprises a central wall member, a pair of side walls at opposite ends of said central wall member, and a plurality of elongated rod members secured to the bottom of said central wall member generally perpendicular thereto and extending on each side of said central wall member.

9. Apparatus according to claim 7, further comprising a wheeled carriage for moving said excavator along the material to be conveyed, and drive means for said wheeled carriage.

10. Apparatus according to claim 7, wherein said excavator further includes a vertically fixed support structure, a frame elevatable with respect to said support structure, and hoist means to elevate said frame relative to said support structure.

* * * * *